Patented July 3, 1923.

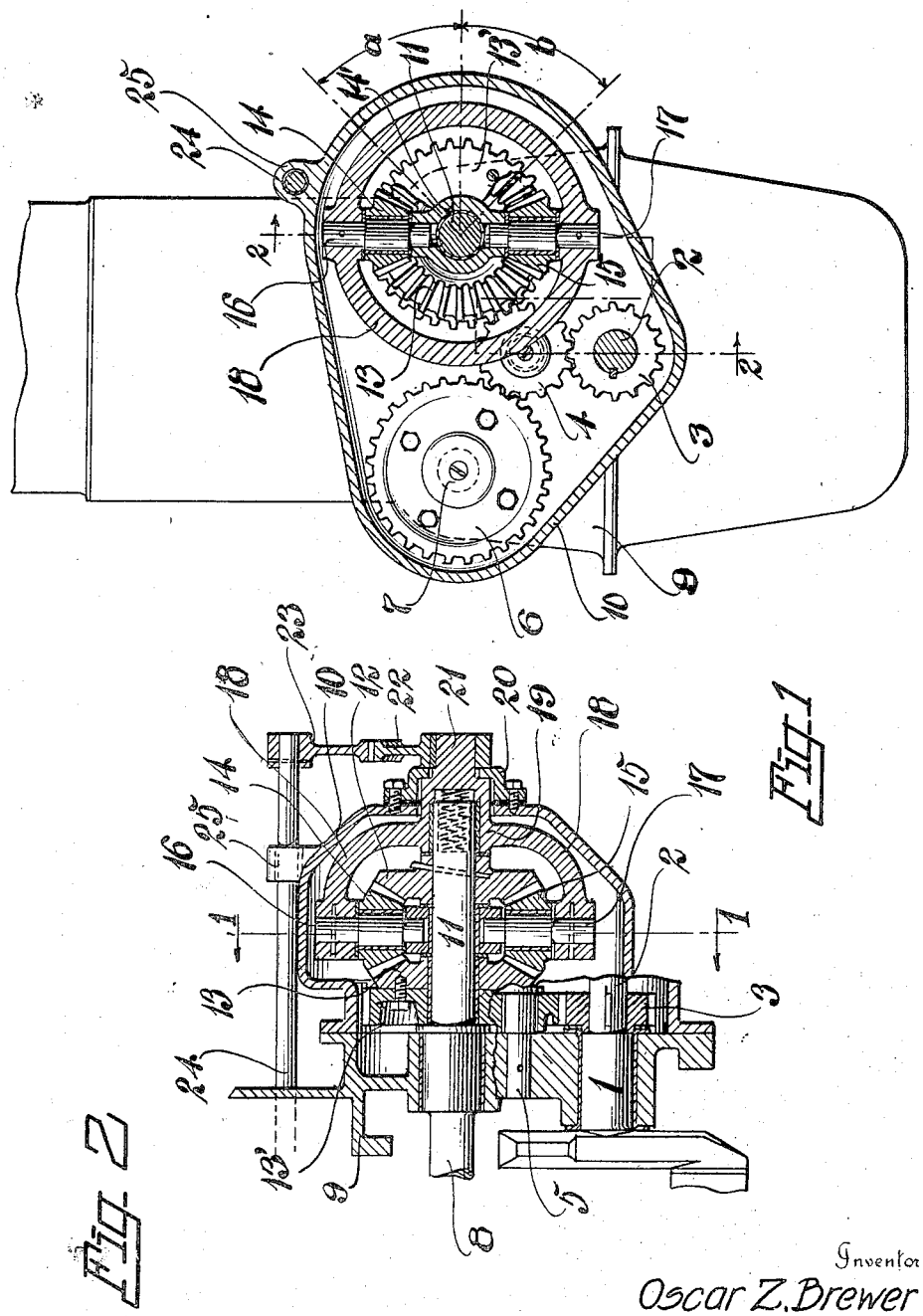

1,460,405

UNITED STATES PATENT OFFICE.

OSCAR Z. BREWER, OF SPOKANE, WASHINGTON.

TIMING MECHANISM.

Application filed December 4, 1919. Serial No. 342,484.

*To all whom it may concern:*

Be it known that I, OSCAR Z. BREWER, a citizen of the United States, residing at Spokane, in the county of Spokane and State of Washington, have invented certain new and useful Improvements in Timing Mechanisms, of which the following is a specification.

The present invention relates to an improved timing mechanism involving a differential gearing in connection with the valve operating mechanism for internal combustion engines or motors of the four cycle type, whereby the action of the exhaust valve is altered in its relation to the inlet valve, during the suspension of operation of the ignition system of the engine, for the purpose of causing a compression of the charge in the cylinder, during the second and fourth strokes of the cycle, thereby retarding the velocity of the motor vehicle which is propelled by the engine.

This action is accomplished through the differential gearing in connection with the driving mechanism for the exhaust valve operating shaft and the peripheral movement of the exhaust shaft is changed with relation to the driving shaft or crank shaft of the engine, the differential gearing being controlled by manually operated connections from the steering column or wheel of the motor vehicle as set forth in a contemporary application for patent filed by me December 4, 1919 and numbered 342,482 and which illustrates the broad principles of the subject matter of this invention.

Figure 1 is a view in section showing parts of the invention at line 1—1 of Figure 2.

Figure 2 is a sectional view of the mechanism at line 2—2 of Figure 1.

In the physical embodiment of the invention illustrated in the drawings the numeral 1 indicates the crank shaft of an engine, which is the driving shaft for the valve operating mechanism of the engine, cylinders, and for purposes of my invention the shaft is fashioned with an extension journal 2 preferably reduced in diameter and carrying the keyed pinion 3, which meshes with an idle pinion 4 journaled on the stud shaft 5 fixed in bearings and transmitting rotary motion to the large gear 6 which is twice the diameter of either the driving or idle wheel and revolves at one half their speed to operate the cam shaft 7 through the instrumentality of which the intake valve mechanism is actuated.

The exhaust valve mechanism is actuated from the cam shaft 8, and these four mentioned shafts are journaled or supported in the engine casing or frame 9 to which the gear casing 10 is attached as shown. Shaft 8 is also provided with an extended journal, as 11, upon which is fixed the bevel gear 12 to revolve therewith, and opposed to this fixed gear is a loose gear 13 of similar size and shape, while a pair of beveled pinions 14 and 15 journaled on the respective stud shafts 16 and 17 fixed in the frame 18, mesh with and connect these bevel gears. The inner adjacent ends of the alined stud shafts 16 and 17 have journal bearings in the loose sleeve 14' revolvable on the journal 11, and it will thus be apparent that the two bevel pinions and the loose bevel gear may oscillate with the frame 18 on the journal 11.

In Figure 2 it will be noted that the frame 18 has a hub or bearing sleeve 19 on the journal 11 at the end of the latter and is retained on the journal end by a collar 20 attached to the gear case 10, while a reduced integral boss 21 projects beyond the collar and has a segmental rack gear 22 fixed thereto. A complementary rack gear 23 engages the rack 22 and is actuated by a rock shaft 24 in bearing 25 of the gear case, the rock shaft 24 being manually operated from the steering column of the motor vehicle as before explained to swing the frame 18 and its differential gearing on the journal 11 of the shaft 8.

As thus described the intake valve is operated through the shaft 7 from the driving or crank shaft by the train of gears 3, 4, and 6 as seen in Figure 1, and the shaft 8 which operates the exhaust valve mechanism is revolved through crank shaft or driving shaft 1 by the train of gears 3, 4, 13' loose on the shaft and attached to the bevel gear 13 also loose on the shaft journal 11, the idle pinions 14, 15 and the fixed bevel gear 12 on the journal, the arrangement being such that the shafts 7 and 8 revolve at one half the speed of the driving shaft or crank shaft 1.

Now assuming the engine to be running under normal conditions with the engines working to propel the motor vehicle, the gear 13 revolves clockwise and the gear 12 revolves counter clockwise. If the vehicle is running down grade and it is desired to retard its speed through compression in the cylinders as described, with the ignition system suspended as to its operation, the boss 21 is turned and with it the frame 18 in a counter-clockwise direction through the angle "b" in Figure 1, while the gear 3 may be considered to be stationary. The frame 18 carries with it the bevel pinions 14 and 15 which will roll on the bevel gear 13 and impart a rotary action to fixed bevel gear 12, so that while the frame is turning or swinging through the angle "b" of Figure 1, gear 12 will be turned through an angle "a—b" or about 90°, and inasmuch as gear 12 moves with half the angular velocity of gear 3 the crank shaft 1 would be required to move backward about 180° to bring the exhaust valve in the original position. Therefore the action of the exhaust valves has been advanced one stroke with relation to the crank shaft by this alteration between the valve shaft and crank shaft, and this is the maximum effect desirable to produce. Between the running position of the gearing and the maximum retardation position of the gearing due to the change in the peripheral movement of the synchronously moving shafts, there is a gradual increase of the braking effect of the piston as it moves to compress the charge during the second and fourth strokes of its cycle.

What I claim is—

The combination in operating gearing including the driven shaft of a gear frame having a hub loose thereon and an axially alined resilient member between said shaft and hub, means for retaining the hub on the shaft, and means for revolving the hub, as described.

In testimony whereof I affix my signature.

OSCAR Z. BREWER.